(12) United States Patent
Ali et al.

(10) Patent No.: US 9,208,570 B2
(45) Date of Patent: Dec. 8, 2015

(54) SYSTEM AND METHOD FOR PERFORMING DEPTH ESTIMATION BY UTILIZING AN ADAPTIVE KERNEL

(75) Inventors: Gazi Ali, Mountain View, CA (US); Pingshan Li, Sunnyvale, CA (US); Akira Matsui, Tokyo (JP); Takami Mizukura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 925 days.

(21) Appl. No.: 13/432,065

(22) Filed: Mar. 28, 2012

(65) Prior Publication Data

US 2013/0258096 A1 Oct. 3, 2013

(51) Int. Cl.
*H04N 7/18* (2006.01)
*G06T 7/00* (2006.01)
*H04N 5/232* (2006.01)

(52) U.S. Cl.
CPC .......... *G06T 7/0069* (2013.01); *H04N 5/23212* (2013.01); *G06T 2207/10004* (2013.01); *G06T 2207/10148* (2013.01)

(58) Field of Classification Search
CPC ................. H04N 5/23212; G06T 2207/10004; G06T 2207/10148; G06T 7/0069
See application file for complete search history.

(56) References Cited

U.S. PATENT DOCUMENTS

| | | | |
|---|---|---|---|
| 6,012,458 A * | 1/2000 | Mo et al. ....................... | 600/437 |
| 6,229,913 B1 | 5/2001 | Nayar et al. | |
| 7,773,111 B2 | 8/2010 | Cleveland et al. | |
| 8,045,046 B1 * | 10/2011 | Li et al. ........................... | 348/349 |
| 8,502,864 B1 * | 8/2013 | Watkins ........................... | 348/52 |
| 9,025,073 B2 * | 5/2015 | Attar et al. ..................... | 348/349 |
| 2004/0126035 A1 | 7/2004 | Kyo | |
| 2008/0062301 A1 | 3/2008 | Zhou | |
| 2010/0284626 A1 | 11/2010 | Malm et al. | |
| 2010/0309362 A1 | 12/2010 | Nagata | |
| 2011/0017827 A1 | 1/2011 | Hayashi et al. | |
| 2011/0025877 A1 | 2/2011 | Gallagher | |
| 2011/0316982 A1 * | 12/2011 | Steurer ........................... | 348/49 |
| 2013/0190736 A1 * | 7/2013 | Fabrikant et al. ................. | 606/5 |

FOREIGN PATENT DOCUMENTS

EP  2 378 760 A2  10/2011

OTHER PUBLICATIONS

Eric Kee, Sylvain Paris, Simon Chen Jue Wang, Modeling and Removing Spatially-Varying Optical Blur, Dartmouth college, Adobe Systems Inc. http://ieeexplore.ieee.org/spl/freeabs_all.jsp?amumber=5753120, http://juew.org/publication/lensblur.pdf, Apr. 8-10, 2011, 1-8 pages.

(Continued)

*Primary Examiner* — Nhon Diep
(74) *Attorney, Agent, or Firm* — Haverstock & Owens LLP

(57) ABSTRACT

A system and method for supporting a depth estimation procedure by utilizing an adaptive kernel includes a capture subsystem for capturing images of a photographic target. The capture subsystem includes an aperture that is adjustable for admitting reflected light from the photographic target to a sensor device. An adaptive kernel is designed in a kernel design procedure based upon symmetry characteristics of the aperture. The adaptive kernel may be designed in either a frequency-domain kernel design procedure or in a spatial-domain kernel design procedure. A depth estimator utilizes the adaptive kernel for performing the depth estimation procedure.

20 Claims, 14 Drawing Sheets

(56) References Cited

OTHER PUBLICATIONS

Levin A et al: Image and Depth From a Conventional Camera With a Coded Aperture, ACM Transactions on Graphics (TOG), US, vol. 26, No. 3, Jul. 1, 2007, XP002622004, ISSN: 0730-0301, DOI: 10.1145/1239451.1239521, pp. 1-9.

Wikipedia.org: Circle of Confusion, www.wikipedia.org, Dec. 21, 2011, XP002698805, URL: http://web.archive.org/web/20120121013809/http://en.wikipedia.org/wiki/Circle_of_confusion, pp. 1-7.

Subbarao M et al.: Depth Recovery From Blurred Edges, Proceedings of the Conference on Computer Vision and Pattern Recognition, Ann Arbor, Jun. 5, 1988, Washington, IEEE Comp. Soc. Press, US, XP010012893, DOI:10.1109/CVPR.1988.196281, ISBN: 978-0-8186-0862-9, pp. 498-503.

* cited by examiner

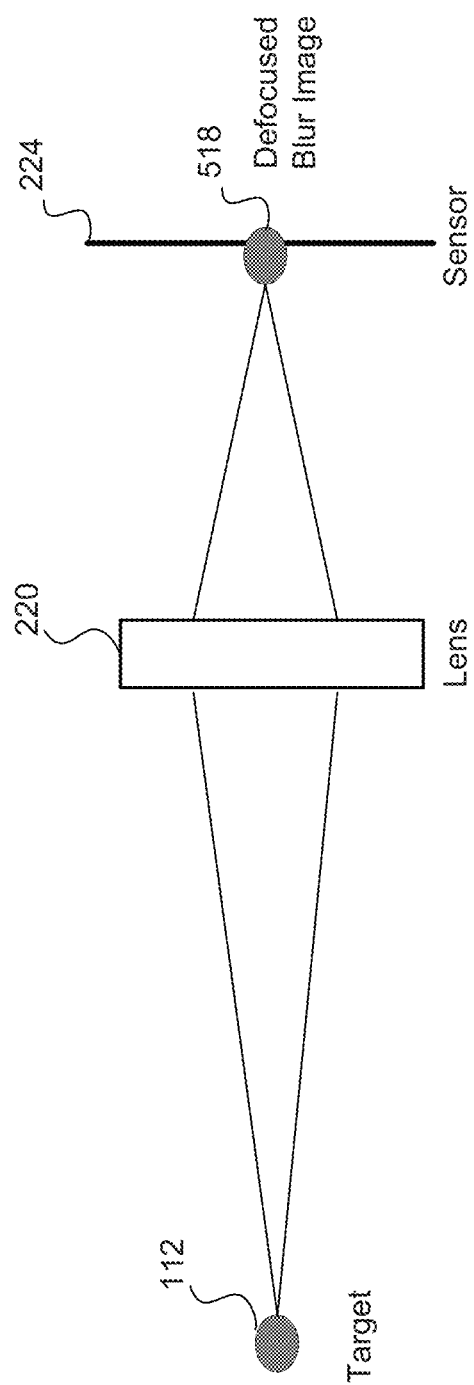

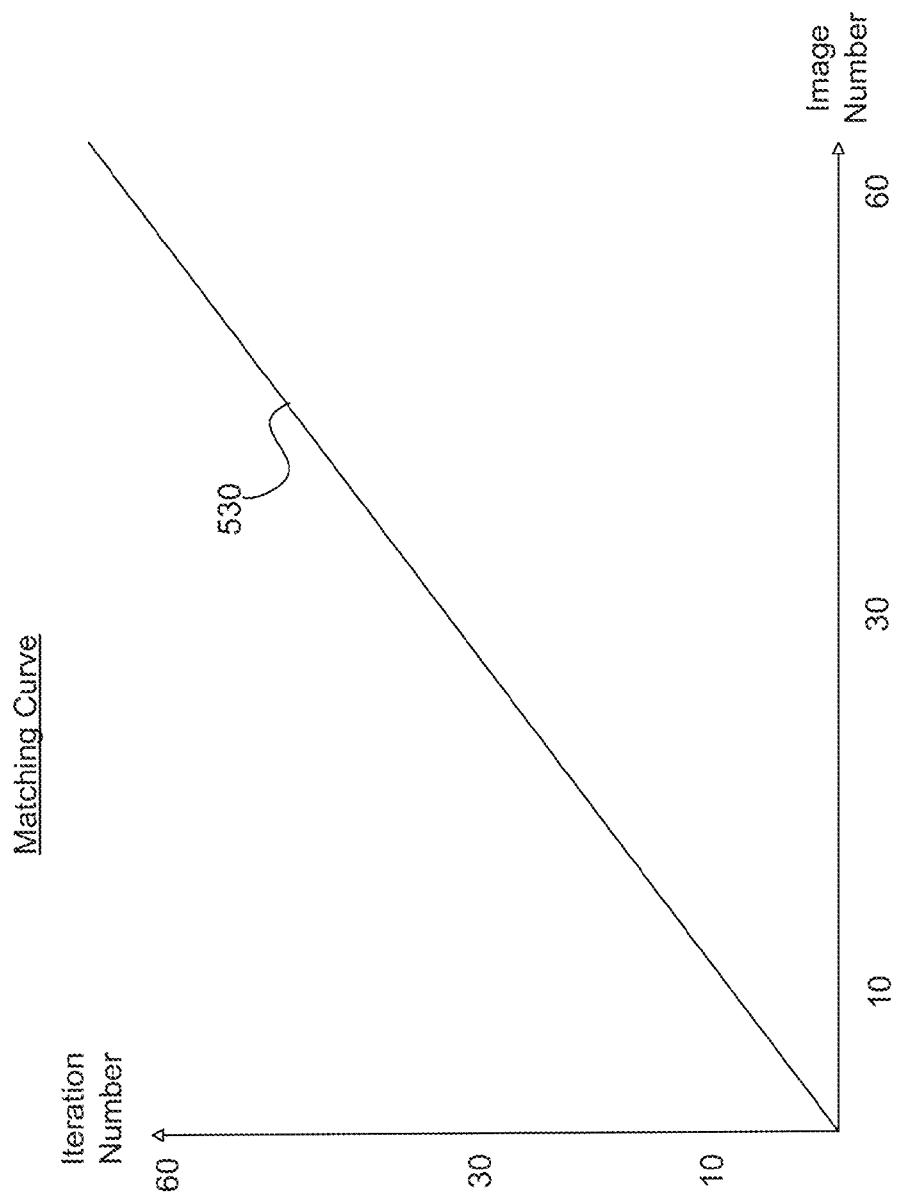

$$h_{horz} = \begin{bmatrix} 1 & 14 & 1 \end{bmatrix} \quad \longleftarrow 828$$

$$\sigma^2_{horz} = 0.189$$

$$h_{vert} = \begin{bmatrix} 1 \\ 6 \\ 1 \end{bmatrix} \quad \longleftarrow 832$$

$$\sigma^2_{vert} = 0.28$$

$$h = h_{vert} \times h_{horz} = \begin{bmatrix} 1 \\ 6 \\ 1 \end{bmatrix} \begin{bmatrix} 1 & 14 & 1 \end{bmatrix} = \begin{bmatrix} 1 & 14 & 1 \\ 6 & 84 & 6 \\ 1 & 14 & 1 \end{bmatrix} \quad \longleftarrow 836$$

$$h_{norm} = \frac{1}{128} \begin{bmatrix} 1 & 14 & 1 \\ 6 & 84 & 6 \\ 1 & 14 & 1 \end{bmatrix} \quad \longleftarrow 840$$

Fig. 8C ical, then an appropriate asymmetrical convolution kernel may be designed in any effective manner. For example, the asymmetrical convolution kernel may be created manually by one or more designers, or may be generated automatically by one or more computer devices. In certain embodiments, the asymmetrical convolution kernel may be designed utilizing a frequency-domain kernel design methodology. In other embodiments, the asymmetrical convolution kernel may be designed utilizing a spatial-domain kernel design methodology. The resulting asymmetrical kernel coefficients may be stored in the local memory of the camera.

SYSTEM AND METHOD FOR PERFORMING DEPTH ESTIMATION BY UTILIZING AN ADAPTIVE KERNEL

BACKGROUND SECTION

1. Field of the Invention

This invention relates generally to techniques for analyzing image data, and relates more particularly to a system and method for performing a depth estimation procedure by utilizing an adaptive kernel.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for performing a depth estimation procedure by utilizing an adaptive kernel is disclosed. Depth estimation procedures may be utilized to create depth maps for corresponding photographic targets or scenes. Non-uniformity in the depth map may be caused by an asymmetrical aperture shape in the camera. One prominent depth-map generation technique is the depth-from-defocus technique in which a convolution kernel is used to match the defocused blur of two images to derive an indirect estimate of the depth. Therefore, the convolution kernel plays a significant role in obtaining accurate depth values.

In one embodiment of the present invention, camera aperture data is obtained in any effective manner. Camera aperture data may include any appropriate information, including, but not limited to, aperture shape, aperture dimensions, and aperture symmetry characteristics. The camera aperture data may be analyzed utilizing any effective techniques. For example, the aperture information analysis may be performed manually by one or more designers, or may be performed automatically by one or more computer devices.

Accordingly, the aperture is determined to be either symmetrical or asymmetrical. If the aperture is symmetrical, then symmetrical kernel coefficients may be stored in a local memory of the camera. However, if the aperture is asym- In operation, the camera may then select an appropriate convolution kernel from memory, depending upon the particular current characteristics of the camera aperture. Finally, the camera may utilize the selected convolution kernel to perform convolution procedures to robustly support the depth estimation procedures. The present invention therefore provides an improved system and method for performing a depth estimation procedure by utilizing an adaptive convolution kernel.

BRIEF DESCRIPTION OF THE DRAWINGS

FIG. 5A is a diagram of one exemplary embodiment for capturing a defocused blur image, in accordance with the present invention;

FIG. 5C is a graph of an exemplary matching curve, in accordance with one embodiment of the present invention;

FIGS. 8A-8C are drawings illustrating spatial-domain kernel design procedure, in accordance with one embodiment of the present invention.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for supporting a depth estimation procedure by utilizing an adaptive kernel, and includes a capture subsystem for capturing images of a photographic target. The capture subsystem includes an aperture that is adjustable for admitting reflected light from the photographic target to a sensor device. An adaptive kernel is designed in a kernel design procedure based upon symmetry characteristics of the aperture. The adaptive kernel may be designed in either a frequency-domain kernel design procedure or in a spatial-domain kernel design procedure. A depth estimator utilizes the adaptive kernel for performing the depth estimation procedure.

Figure 1:
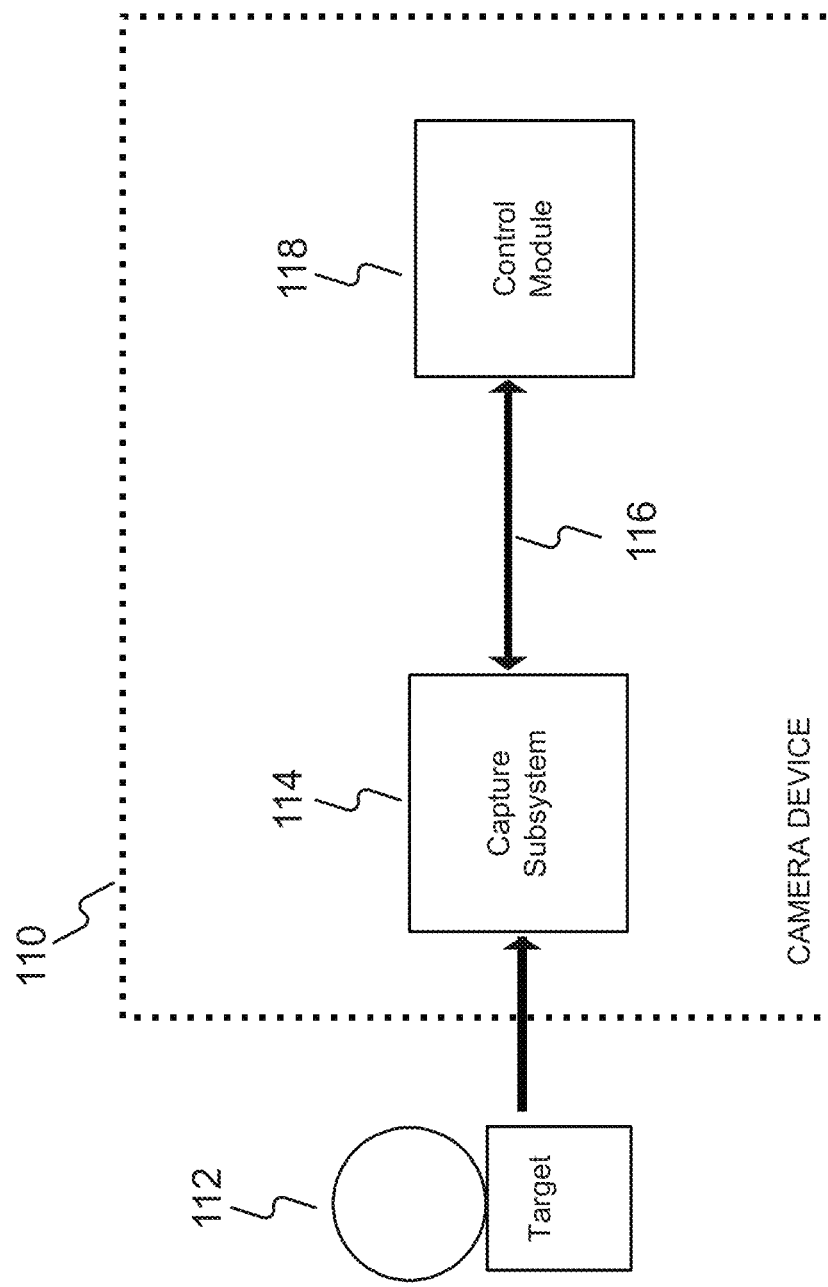
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
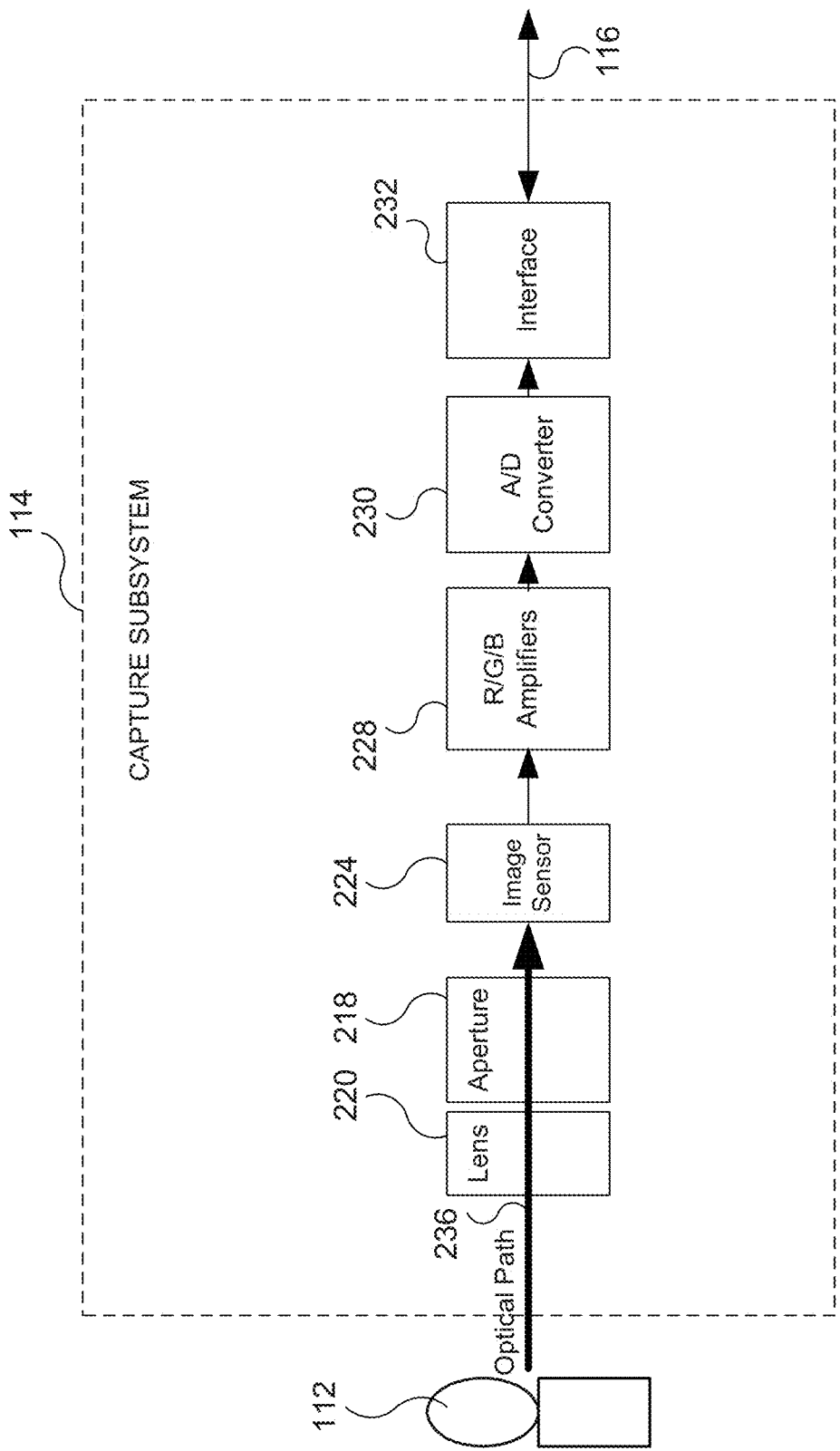
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, an aperture 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. In certain embodiments, aperture 218 includes a shutter mechanism that is controllable to regulate the amount of reflected light that reaches image sensor 224. Image sensor 224, which may preferably include a charged-coupled device (CCD), may responsively generate a set of image data representing the target 112.

The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-8C.

Figure 3:
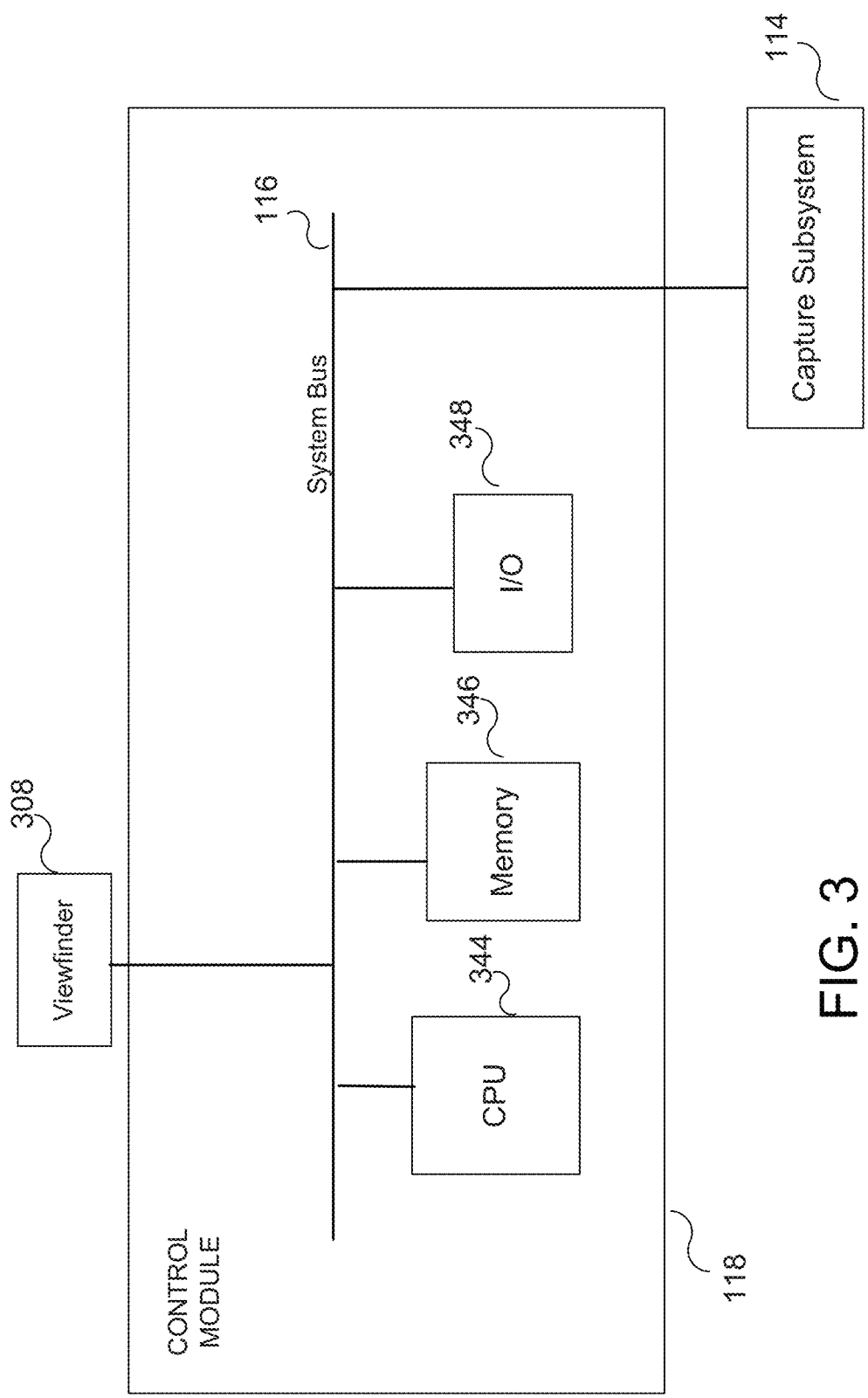
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 8C.

Figure 4:
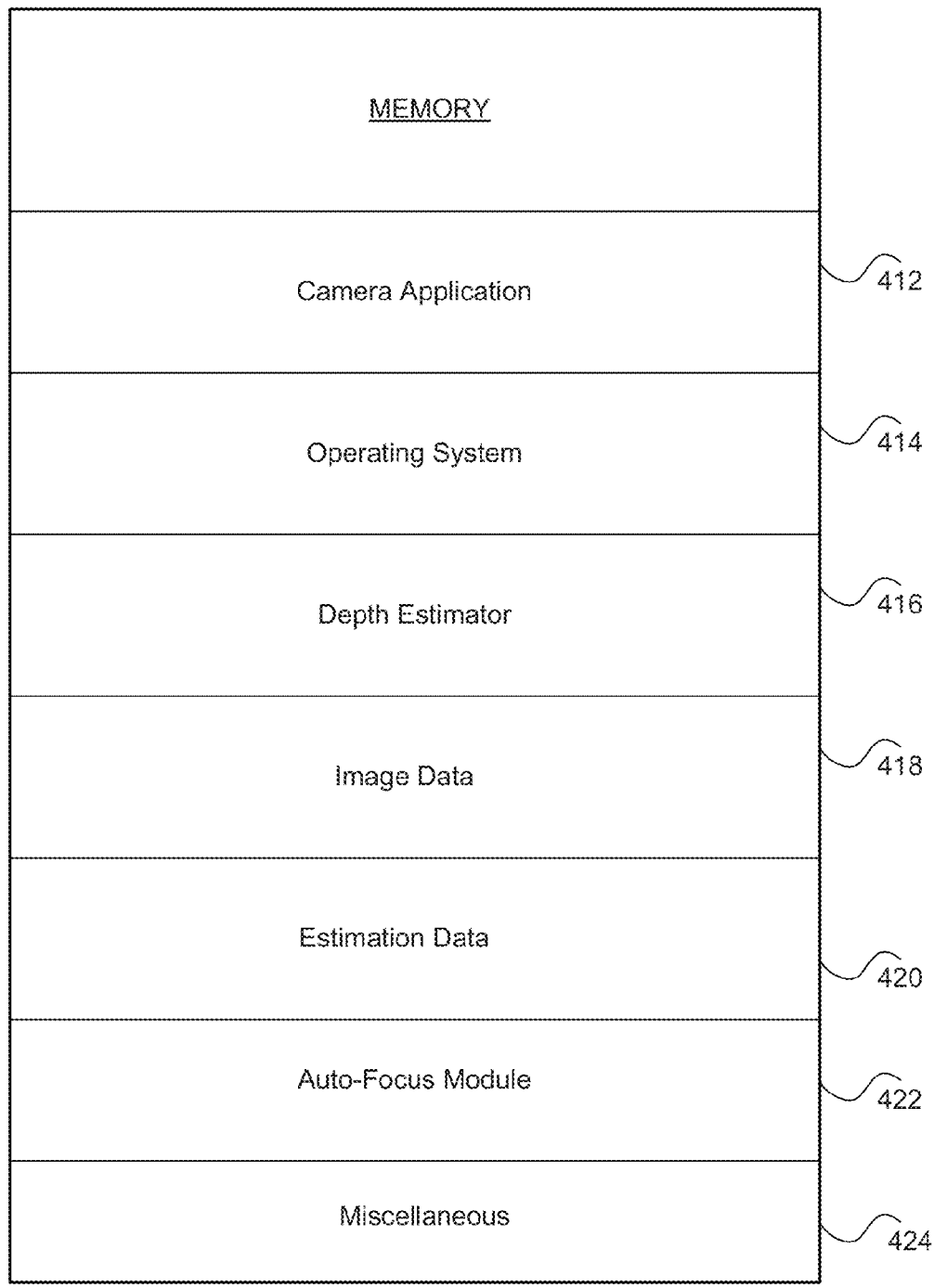
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and miscellaneous information 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. For example, estimation data 420 may include one or more symmetrical or asymmetrical convolution kernels, as discussed below. In the FIG. 4 embodiment, auto-focus module 422 may utilize the results of the depth estimation procedure to perform an auto-focus procedure for camera device 110. Miscellaneous information 424 includes any other appropriate information for the operation of camera 110. Additional details regarding the operation of depth estimator 416 are further discussed below in conjunction with FIGS. 5A-8C.

Referring now to FIG. 5A, a diagram of one exemplary embodiment for capturing a defocused blur image 518 is shown, in accordance with the present invention. The FIG. 5A embodiment is provided for purposes of illustration, and in alternate embodiments, the present invention may utilize various other configurations and elements to capture defocused blur images 518.

In the FIG. 5A embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are one depth-of-field away from each other. A slope of a known matching curve and the blur difference can be utilized to determine the depth of a given target 112. The generation and utilization of defocused blur images for depth estimation are further discussed below in conjunction with FIGS. 6-8C.

Figure 5B:
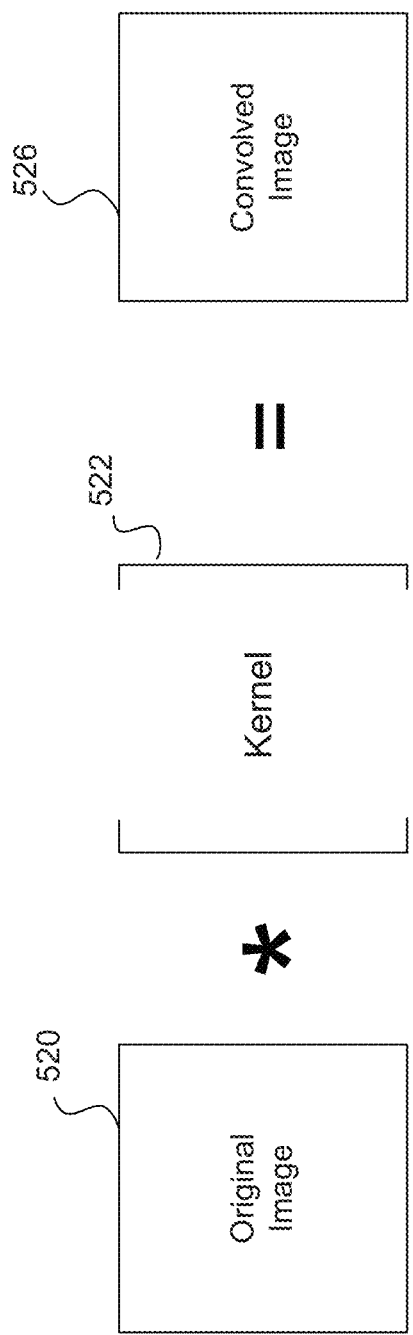
FIG. 5B is a diagram illustrating a kernel convolution procedure, in accordance with one embodiment of the present invention.

Referring now to FIG. 5B, a diagram illustrating a kernel convolution procedure is shown, in accordance with one embodiment of the present invention. The FIG. 5B embodiment is provided for purposes of illustration, and in alternate embodiments, the present invention may utilize various other configurations and techniques to perform kernel convolution procedures.

In the FIG. 5B embodiment, an original image 520 may be convolved with a Gaussian convolution kernel 522 that is implemented in any effective manner to produce a convolved image 526. In certain embodiments, kernel 522 may be implemented as a filter matrix with individual kernel coefficients that are each applied to different corresponding respective pixel values of original image 520. The resulting values may then be combined to create a convolved central pixel value for the convolved image 526. The convolution procedure may then be repeated for each pixel in original image 520 to completely populate convolved image 526. The generation and utilization of convolution kernels for depth estimation are further discussed below in conjunction with FIGS. 5C-8C.

Referring now to FIG. 5C, a graph of an exemplary matching curve 714 is shown, in accordance with one embodiment of the present invention. The FIG. 5C embodiment is presented for purposes of illustration, and in alternate embodiments, the present invention may be implemented to utilize matching curves with configurations and parameters in addition to, or instead of, certain of those configurations and parameters discussed in conjunction with the FIG. 5C embodiment.

In certain embodiments, a blur image1 and a more-defocused blur image2 may be captured, the sharper image1 may be convolved with a Gaussian convolution kernel (for example, a 3×3 Gaussian matrix with small variance) to produce a convolved image1. The convolved image1 is compared to blur image2. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding convolution kernels and the foregoing depth estimation technique are further discussed in U.S. Pat. No. 8,045,046 to Li et al., which is hereby incorporated by reference.

Figure 6A:
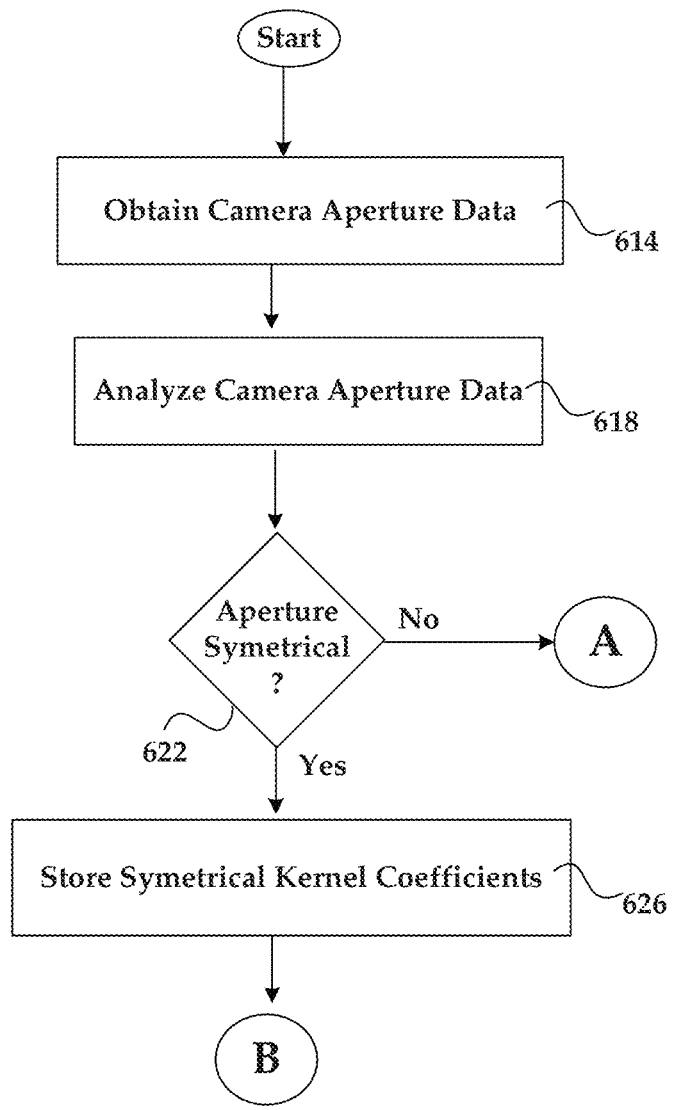
FIGS. 6A-6B are a flowchart of method steps for performing a depth estimation procedure with an adaptive kernel, in accordance with one embodiment of the present invention.
Figure 6B:
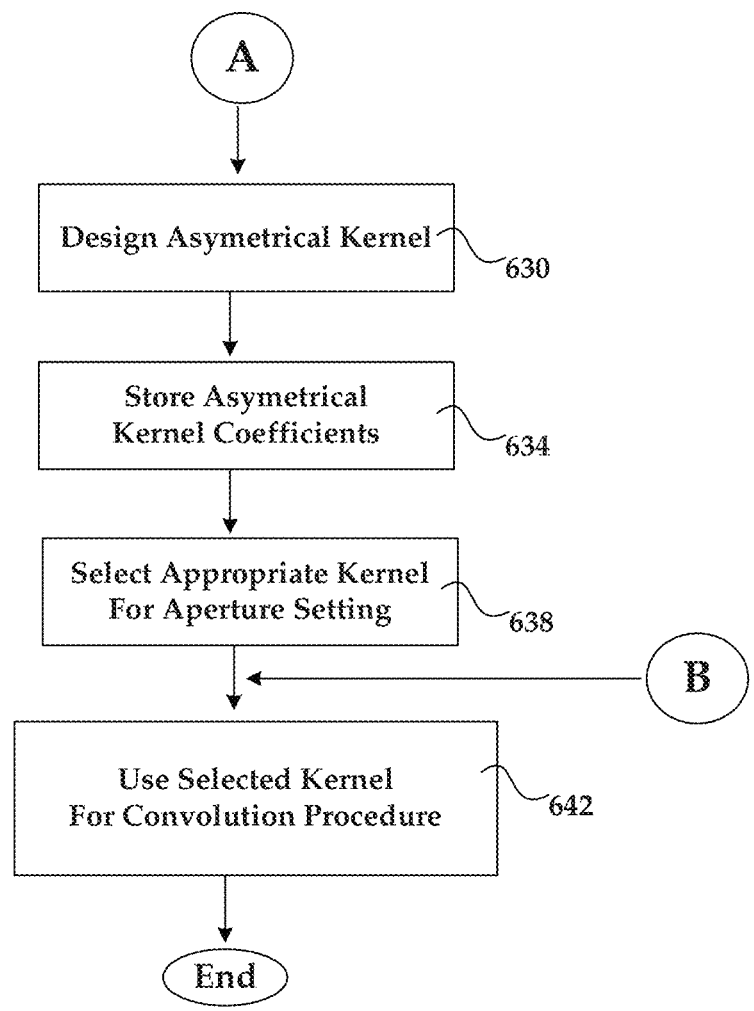

Referring now to FIGS. 6A-6B, a flowchart of method steps for performing a depth estimation procedure with an adaptive kernel is shown, in accordance with one embodiment of the present invention. The FIG. 6 embodiment is presented for purposes of illustration, and in alternate embodiments, the present invention may readily utilize various steps and sequences other than those steps and sequences discussed in conjunction with the FIG. 6 embodiment.

Depth estimation procedures may be utilized to create depth maps for corresponding photographic targets or scenes. Non-uniformity in the depth map may frequently be caused by an asymmetrical aperture shape of the camera. In most of the cases, the asymmetric aperture shape causes the point spread function (PSF) of the camera to be asymmetric also. As a result, the depth map obtained using these cameras shows image orientation dependency. The present invention may advantageously be utilized to design depth map algorithms that can appropriately handle asymmetric characteristics of various camera apertures.

In practice, depth maps may be generated from single or multiple images using various different techniques. For example, depth information may be recovered from a 2D-image using depth from defocus, stereo imaging, depth from shading etc. One prominent passive depth-map generation technique is the depth from defocus technique (DFD). In DFD, a convolution kernel is used to match the blur of two image regions to derive an indirect estimate of the depth. Therefore, the convolution kernel plays a significant role in obtaining the depth values.

Conventionally, a symmetric and uniform convolution kernel is applied for the entire image irrespective of camera settings. This typically causes problems, since the PSF of the camera is dependent on camera parameters like, for example, the aperture settings. An asymmetric aperture shape makes the PSF asymmetric, and the symmetric convolution kernel then will fail to capture proper depth. The present invention effectively supports the design and utilization of adaptive kernels based on factors such as camera aperture information, so the resulting depth map is uniform, consistent, and reliable.

In the FIG. 6A embodiment, in step 614, camera aperture data is obtained in any effective manner. Camera aperture data may include any appropriate information, including, but not limited to, aperture shape, aperture dimensions, and aperture symmetry characteristics. In step 618, the camera aperture data may be analyzed utilizing any effective techniques. For example, the aperture information analysis may be performed manually by one or more designers or may be performed automatically by one or more computer devices.

In step 622, the aperture is determined to be either symmetrical or asymmetrical. If the aperture is symmetrical, then symmetrical kernel coefficients are stored in memory 346 (FIG. 3) of camera 110, and the FIG. 6A process advances to step 642 of FIG. 6B through connecting letter "B." However, if the aperture is asymmetrical, then the FIG. 6A process advances to step 630 of FIG. 6B through connecting letter "A."

In step 630, an appropriate asymmetrical convolution kernel may be designed in any effective manner. For example, the asymmetrical convolution kernel may be created manually by one or more designers, or may be generated automatically by one or more computer devices. In certain embodiments, the asymmetrical convolution kernel may be designed utilizing a frequency-domain kernel design methodology. In addition, in other embodiments, the asymmetrical convolution kernel may be designed utilizing a spatial-domain kernel design methodology. In step 634, the resulting asymmetrical kernel coefficients may be stored in memory 346 (FIG. 3) of camera 110.

In step 638, camera 110 may then select an appropriate convolution kernel from memory 346, depending upon the particular current characteristics of the camera aperture. Finally, in step 642, camera 110 may utilize the selected convolution kernel to perform appropriate convolution procedures to support depth estimation procedures. The FIG. 6 process may terminate. The present invention therefore provides an improved system and method for performing a depth estimation procedure by utilizing an adaptive convolution kernel.

Figure 7A:
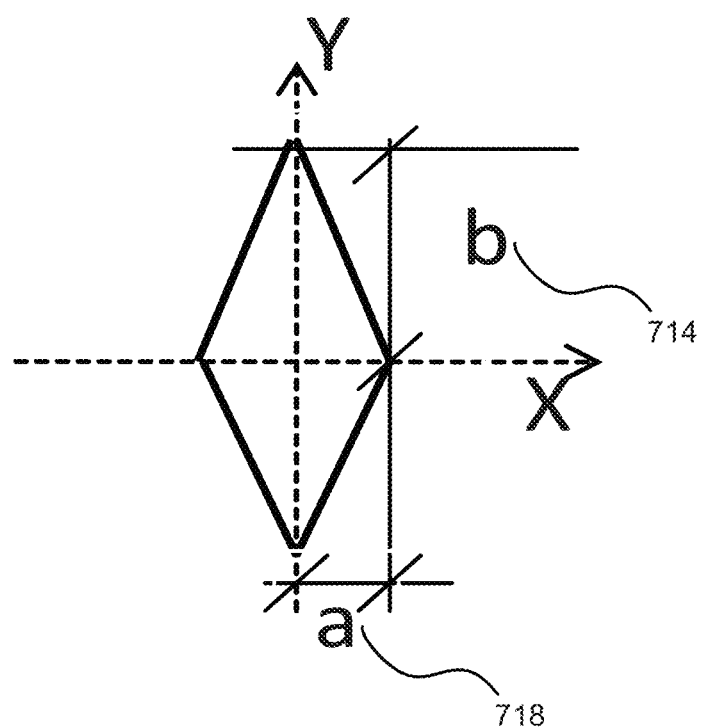
FIGS. 7A-7B are drawings illustrating a frequency-domain kernel design procedure, in accordance with one embodiment of the present invention.
Figure 7B:
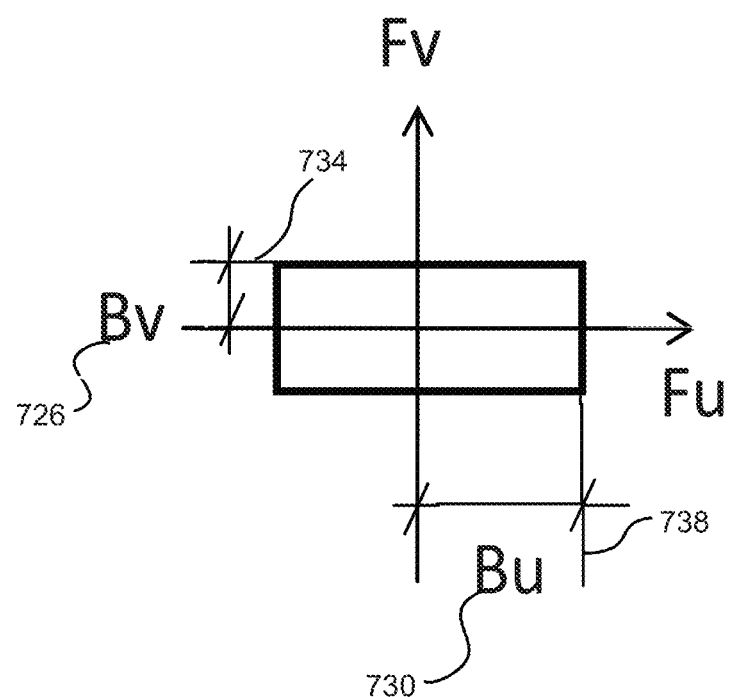

Referring now to FIGS. 7A-7B, drawings illustrating a frequency-domain kernel design procedure are shown, in accordance with one embodiment of the present invention. The FIG. 7 embodiment is presented for purposes of illustration, and in alternate embodiments, the present invention may perform kernel design procedures with elements and configurations other than those discussed in conjunction with the FIG. 7 embodiment.

In the FIG. 7A embodiment, a graph of an asymmetrical aperture 712 is shown in the spatial domain. In the FIG. 7A embodiment, a first aperture dimension is represented on a vertical axis Y, and a second aperture dimension is represented on a horizontal axis X. In the FIG. 7A embodiment, aperture 712 includes a horizontal dimension "a" 718, and a vertical dimension "b" 714. As represented in the FIG. 7A drawing, horizontal dimension "a" 718 and vertical dimension "b" 714 are not equal, rendering aperture 712 asymmetrical.

In the FIG. 7B embodiment, a representation 722 in the frequency domain of the asymmetrical aperture 712 of FIG. 7A is shown. In certain embodiments, the FIG. 7B representation 722 may be generated by applying an appropriate Fast Fourier Transform (FFT) to the spatial-domain aperture 712 of FIG. 7A. In the FIG. 7A embodiment, vertical frequency is represented on a vertical axis Fv, and horizontal frequency is represented on a horizontal axis Fu. In the FIG. 7B embodiment, representation 722 includes a horizontal bandwidth "Bu" 730, and a vertical bandwidth "Bv" 726.

In the FIG. 7B embodiment, horizontal bandwidth "Bu" 730 corresponds to horizontal dimension "a" 718 of FIG. 7A, and vertical bandwidth "Bv" 726 corresponds to vertical dimension "b" 714 of FIG. 7A. In the FIG. 7B embodiment, horizontal bandwidth "Bu" 730 is limited by a horizontal cutoff frequency 738, and vertical bandwidth "Bv" 726 is limited by a vertical cutoff frequency 734. Frequency variables "Bu" and "Bv" represent bandwidth characteristics (how much frequency can be supported with the aperture). The cutoff frequencies may be utilized to design filter kernels for the two bandwidths. Any standard or enhanced filter design techniques may be utilized. This information must then be combined to generate an asymmetrical convolution kernel.

In practice, an FFT is initially applied to the point spread function (PST) of aperture 712 (FIG. 7A). Horizontal and vertical filters may then be designed based upon the horizontal cutoff frequency and vertical cutoff frequency. The horizontal filter and the vertical filter are then combined to generate a combined filter. An inverse FFT is performed on the combined filter to produce an asymmetrical convolution kernel. In certain embodiments, the convolution kernel may need to be approximated with a reduced-size kernel if the original kernel exceeds a certain kernel size.

Figure 8A:
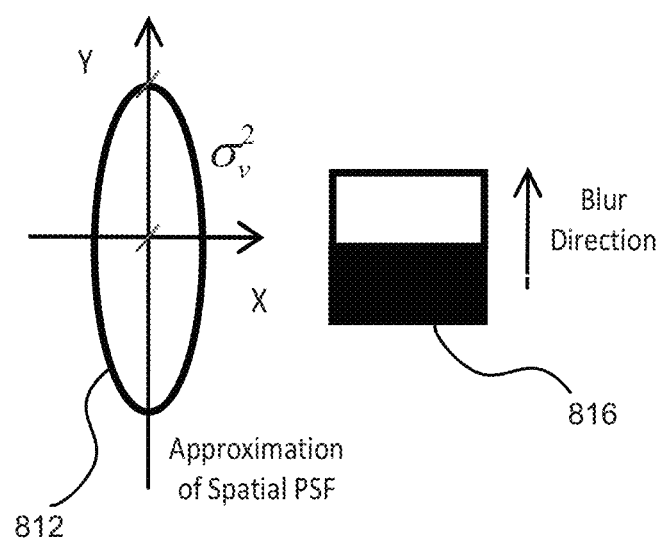
Figure 8B:
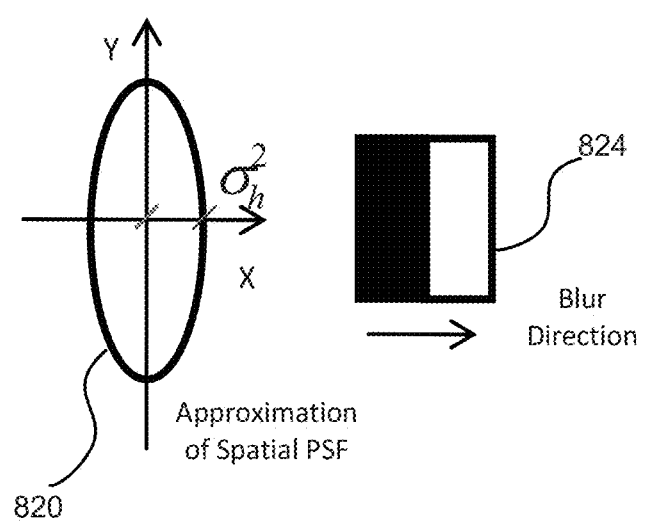

Referring now to FIGS. 8A-8C, drawing illustrating a spatial-domain kernel design procedure are shown, in accordance with one embodiment of the present invention. The FIG. 8 embodiment is presented for purposes of illustration, and in alternate embodiments, the present invention may perform kernel design procedures utilizing elements and techniques other than those discussed in conjunction with the FIG. 8 embodiment.

In the FIG. 8A embodiment, a horizontal test page image 816 is shown. In addition, a graph of an asymmetrical aperture 812 in the spatial domain is shown corresponding to the image 816. Similarly, in the FIG. 8B embodiment, a vertical test page image 824 is shown. In addition, a graph of an asymmetrical aperture 820 in the spatial domain is shown corresponding to the image 824. The vertical test page image 824 is the horizontal test page image 816 rotated ninety degrees.

When using horizontal test page 816, the defocus blur is in the vertical (Y) direction and the iteration number is proportional to the PSF variance in the vertical direction. When using vertical test page 824, the defocus blur is in the horizontal (X) direction and the iteration number is proportional to the PSF variance in the horizontal direction. In accordance with the present invention, a spatial analysis of the FIGS. 8A and 8B embodiments may be performed to generate an asymmetrical convolution kernel, as further discussed below in conjunction with FIG. 8C.

The FIG. 8C embodiment is presented for purposes of illustration, and in alternate embodiments, the present invention may perform kernel design procedures utilizing elements and techniques other than those discussed in conjunction with the FIG. 8 embodiment. For example, the various specific calculation or implementation values provided in the FIG. 8C example, may be replaced by any other effective or appropriate calculation or implementation values.

The FIG. 8C example includes a horizontal filter kernel 828, a vertical filter kernel 832, a horizontal-vertical filter combination process 836, and a final asymmetrical convolution kernel 840. In accordance with one embodiment of the present invention, a spatial domain analysis may be performed upon the foregoing FIGS. 8A and 8B embodiments to generate a representative equation (see Equation 1 below) for defining asymmetrical convolution kernels 840 according to the following variables.

$$n_1 \sigma_k^2 \propto \sigma_v^2$$

$$n_2 \sigma_k^2 \propto \sigma_h^2$$

here, $n_1$=iteration number using horizontal test page and [161] kernel $n_2$=iteration number using vertical test page and [161] kernel $\sigma_k^2$=Variance of [161] kernel $\sigma_h^2$=Gaussain approximation of blur along horizontal (X) direction $\sigma_v^2$=Gaussain approximation of blur along vertical (Y) direction $$\frac{\sigma_v^2}{\sigma_h^2} = \frac{n_1}{n_2} \approx 2 \qquad \text{[Equation 1]}$$

Therefore, in the FIG. 8 example, Equation 1 indicates that there should be an approximate 2-to-1 relationship between the vertical variance value and the horizontal variance value. In the FIG. 8C example, horizontal filter kernel 828 and vertical filter kernel 832 are thus combined in horizontal-vertical filter combination process 836 to produce final asymmetrical convolution kernel 840, in accordance with one embodiment of the present invention.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting a depth estimation procedure, comprising:
    a capture subsystem for capturing images of a photographic target, said capture subsystem including an aperture that is adjustable for admitting reflected light from said photographic target to a sensor device;
    an adaptive kernel that is designed in a kernel design procedure based upon symmetry characteristics of said aperture; and
    a depth estimator that utilizes said adaptive kernel for performing said depth estimation procedure.

2. The system of claim 1 wherein said depth estimator and said capture subsystem are implemented in a digital camera device.

3. The system of claim 2 wherein depth values from said depth estimation procedure are utilized in an auto-focus procedure for said digital camera.

4. The system of claim 1 wherein said images include defocused blur images of said photographic target.

5. The system of claim 4 wherein said depth estimator utilizes said adaptive kernel to perform one or more convolution procedures during said depth estimation procedure.

6. The system of claim 1 wherein said adaptive kernel is designed in a frequency-domain kernel design procedure.

7. The system of claim 1 wherein said adaptive kernel is designed in a spatial-domain kernel design procedure.

8. The system of claim 1 wherein said symmetry characteristics of said aperture include an aperture shape.

9. The system of claim 1 wherein said symmetry characteristics of said aperture include aperture dimensions.

10. The system of claim 1 wherein said symmetry characteristics of said aperture are analyzed by comparing a horizontal characteristic of said aperture with a vertical characteristic of said aperture.

11. The system of claim 1 wherein said kernel design procedure includes obtaining camera aperture data including an aperture shape and aperture dimensions, said kernel design procedure further including analyzing said camera aperture data to determine said symmetry characteristics.

12. The system of claim 11 wherein symmetrical kernel coefficients are stored in a local memory device if said symmetry characteristics indicate that said aperture is symmetrical.

13. The system of claim 12 wherein asymmetrical kernel coefficients are designed in said kernel design procedure, said asymmetrical kernel coefficients being stored in said local memory device if said symmetry characteristics indicate that said aperture is asymmetrical.

14. The system of claim 13 wherein said asymmetrical kernel coefficients are designed in a frequency-domain kernel design procedure.

15. The system of claim 14 wherein said frequency-domain kernel design procedure includes applying a Fast Fourier Transform to a point spread function of said aperture, designing a horizontal filter and a vertical filter based upon a horizontal cutoff frequency and a vertical cutoff frequency of said Fast Fourier Transform, said horizontal filter and said vertical filter being then combined to generate a combined filter, an inverse Fast Fourier Transform being performed on said combined filter to produce said adaptive kernel.

16. The system of claim 13 wherein said asymmetrical kernel coefficients are designed in a spatial-domain kernel design procedure.

17. The system of claim 16 wherein said spatial-domain kernel design procedure includes performing a spatial domain analysis upon a horizontal point spread function and a vertical point spread function of said aperture to define a mathematical relationship between a vertical variance value and a horizontal variance value of said aperture, said spatial-domain kernel design procedure further including generating a horizontal filter kernel and a vertical filter kernel based upon said mathematical relationship, said horizontal filter kernel and said vertical filter kernel being combined in filter combination process to produce said adaptive kernel.

18. The system of claim 13 wherein said depth estimator selects an optimal kernel from said local memory device depending upon said symmetry characteristics of said aperture.

19. The system of claim 18 wherein said depth estimator utilizes said optimal kernel for performing said depth estimation procedure.

20. A method for performing a depth estimation procedure by performing the steps of:
    utilizing a capture subsystem for capturing images of a photographic target, said capture subsystem including an aperture that is adjustable for admitting reflected light from said photographic target to a sensor device;
    designing an adaptive kernel in a kernel design procedure based upon symmetry characteristics of said aperture; and
    providing a depth estimator that utilizes said adaptive kernel for performing said depth estimation procedure.

* * * * *